United States Patent
Lal

(10) Patent No.: US 10,592,203 B2
(45) Date of Patent: Mar. 17, 2020

(54) DEVICE INCLUDING A DIGITAL ASSISTANT FOR PERSONALIZED SPEECH PLAYBACK AND METHOD OF USING SAME

(71) Applicant: Mitel Networks Corporation, Ottawa (CA)

(72) Inventor: Sachin Kumar Lal, Bengaluru (IN)

(73) Assignee: Mitel Networks Corporation, Ottawa, Ontario (CA)

(*) Notice: Subject to any disclaimer, the term of this patent is extended or adjusted under 35 U.S.C. 154(b) by 86 days.

(21) Appl. No.: 15/845,858

(22) Filed: Dec. 18, 2017

(65) Prior Publication Data
US 2019/0187952 A1 Jun. 20, 2019

(51) Int. Cl.
| | | |
|---|---|---|
| G06F 3/16 | (2006.01) | |
| G10L 15/22 | (2006.01) | |
| G10L 13/08 | (2013.01) | |
| G10L 15/26 | (2006.01) | |
| G10L 13/04 | (2013.01) | |
| G06F 17/27 | (2006.01) | |
| G10L 25/63 | (2013.01) | |

(52) U.S. Cl.
CPC .............. *G06F 3/167* (2013.01); *G06F 3/165* (2013.01); *G06F 17/2735* (2013.01); *G10L 13/04* (2013.01); *G10L 13/043* (2013.01); *G10L 13/08* (2013.01); *G10L 15/22* (2013.01); *G10L 15/26* (2013.01); *G10L 25/63* (2013.01)

(58) Field of Classification Search
CPC ...................................................... G06F 3/167
USPC ......................................................... 704/251
See application file for complete search history.

(56) References Cited

U.S. PATENT DOCUMENTS

| | | | |
|---|---|---|---|
| 6,446,041 B1 | 9/2002 | Reynar et al. | |
| 7,305,691 B2* | 12/2007 | Cristofalo | H04N 5/4401 348/E5.093 |
| 7,870,245 B2* | 1/2011 | Butler | H04L 69/329 709/223 |
| 7,925,797 B2* | 4/2011 | Wolff-Peterson | G06F 9/4411 710/10 |
| 8,103,509 B2* | 1/2012 | Burns | G10L 13/08 455/414.4 |
| 8,315,875 B2* | 11/2012 | Burns | G10L 13/08 455/414.4 |
| 8,392,453 B2* | 3/2013 | Baluja | G06F 17/2735 707/771 |
| 8,761,382 B2* | 6/2014 | Pollitt | H04M 3/42017 379/373.01 |
| 8,793,118 B2* | 7/2014 | Srinivasa | G09B 21/009 704/2 |
| 8,917,842 B2* | 12/2014 | Rashid | H04M 3/02 379/142.06 |
| 8,972,444 B2* | 3/2015 | Baluja | G06F 3/0237 707/771 |
| 9,307,440 B1* | 4/2016 | Bertz | H04W 28/0226 |
| 9,858,925 B2* | 1/2018 | Gruber | G10L 15/18 |
| 10,241,752 B2* | 3/2019 | Lemay | G06F 3/167 |

(Continued)

*Primary Examiner* — Susan I McFadden

(57) ABSTRACT

A method and device for reviewing audio content are provided. The method includes using a digital assistant on a device to review audio content (e.g., recorded audio information and/or text converted to speech) in a preferred tone and/or at a preferred rate. The digital assistant can also provide video, images, and/or web links during playback of the audio information to further assist a listener.

19 Claims, 3 Drawing Sheets

(56) References Cited

U.S. PATENT DOCUMENTS

| | | |
|---|---|---|
| 2005/0261905 A1 | 11/2005 | Pyo et al. |
| 2007/0100628 A1 | 5/2007 | Bodin et al. |
| 2010/0064053 A1 | 3/2010 | Bull et al. |
| 2015/0371663 A1* | 12/2015 | Gustafson ............. G10L 15/265 704/270.1 |
| 2016/0379638 A1 | 12/2016 | Basye et al. |

* cited by examiner

DEVICE INCLUDING A DIGITAL ASSISTANT FOR PERSONALIZED SPEECH PLAYBACK AND METHOD OF USING SAME

FIELD OF THE INVENTION

The present disclosure generally relates to methods and devices for playback of audible information. More particularly, the disclosure relates to methods and devices that use a digital assistant to personalize playback of the audible information.

BACKGROUND OF THE DISCLOSURE

Recorded audible information, such as recorded speech, is used for a variety of applications. For example, audible speech recordings are left as voicemail messages, people listen to recorded books, podcasts, and the like, and recorded audible information can be used as a teaching tool—for example, to teach another language or for other subjects.

An ability of a person to understand playback of audible content (e.g., speech) can depend on the user's/listener's command over a language, accent of a narrator of the recorded information (e.g., relative to an accent of a listener), and the like, along with the user's command of cultural and regional influences on a language. For example, when listening to playback of recorded audible information, if the user doesn't understand the language or dialect of the recorded speech, the listener may have to slow down the playback of the speech and/or replay some or all of the recorded speech one or more, e.g., several times. Additionally or alternatively, the listener may resort to use dictionary to understand keywords. This results in delay in listening to the information and of understanding the subject matter of the recorded information.

A speed of the spoken information, a tone of the voice that recorded the information, and even the recorded words can affect a listener's/user's understanding of the subject matter of the recorded information when listening to playback of the recorded information. The same can be true when listening to audible information derived from a text to speech converter.

As the listener becomes familiar with a language, dialect, tone, or the like over time, the listener's vocabulary builds, and as a result, the listener/user may be able to pick up content of recorded audible information at a much faster pace. Hence, a solution that can help a user/listener understand content of playback of recorded audible information by personalizing the content based on the user's command of, for example a language or dialect, is desired.

Any discussion of problems provided in this section has been included in this disclosure solely for the purposes of providing a context for the present invention, and should not be taken as an admission that any or all of the discussion was known at the time the invention was made.

BRIEF DESCRIPTION OF THE DRAWING FIGURES

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements and wherein:

It will be appreciated that elements in the figures are illustrated for simplicity and clarity and have not necessarily been drawn to scale. For example, the dimensions of some of the elements in the figures may be exaggerated relative to other elements to help to improve understanding of illustrated embodiments of the present invention.

DETAILED DESCRIPTION OF EXEMPLARY EMBODIMENTS

The description of exemplary embodiments of the present invention provided below is merely exemplary and is intended for purposes of illustration only; the following description is not intended to limit the scope of the invention disclosed herein. Moreover, recitation of multiple embodiments having stated features is not intended to exclude other embodiments having additional features or other embodiments incorporating different combinations of the stated features.

As set forth in more detail below, exemplary embodiments of the disclosure provide devices and methods for playback of recorded audible information and/or for playing information received from a text-to-speech converter. While the ways in which the present disclosure addresses various drawbacks of prior devices and methods, in general, various devices and methods described herein use a digital assistant that interacts with a user (listener) to form a digital vocabulary for the user. The digital vocabulary can include, for example, a list of the words most commonly used by the user. As set forth in more detail below, the assistant can learn about preferred speed and/or tone of speech of speech playback of a user and use (e.g., automatically) that speed and/or tone during playback of recorded speech and/or of text converted to speech. The digital assistant can continuously collect speed, tone, and other information to evolve as the user's command over a language evolves (e.g., improves) and/or indicate that a user's command of a language is not improving over time. With a user's consent, the digital assistant can analyze additional information (e.g., a user's written content like emails, documents, text message or the like) or other audible information, such as live calls, to further analyze a listener's vocabulary (e.g., commonly used words and/or words that a listener has had to look up) and continuously evolve.

Figure 1:
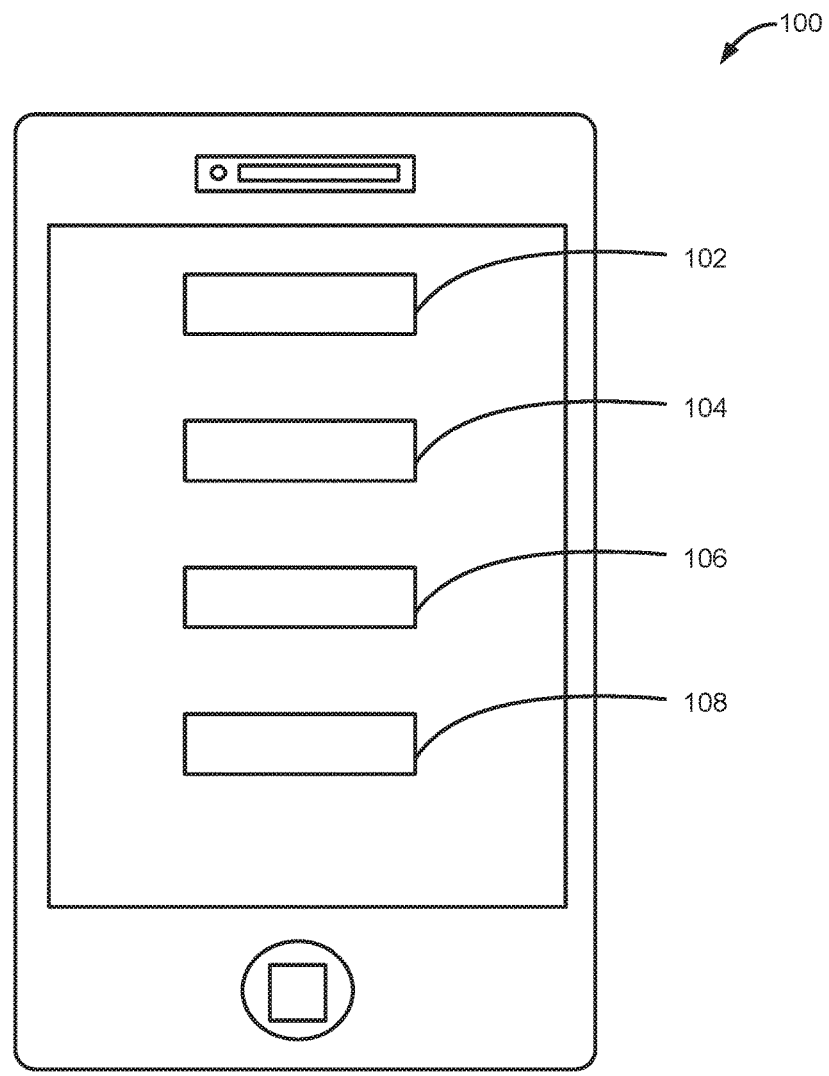
FIG. 1 illustrates a device in accordance with exemplary embodiments of the disclosure.

Turing now to the figures, FIG. 1 illustrates a device 100 for reviewing audio content in accordance with exemplary embodiments of the disclosure. Device 100 includes a processor 102, a speaker 104 coupled to processor 102, a microphone 106 coupled to the processor; and a computer usable medium 108 comprising a computer readable program code recorded or storable in computer useable medium 108. The computer readable program code includes a digital assistant to analyze one or more of a tone and a speed of spoken content received from a user through microphone 106, to use speaker 104 to play the audio content, to update a personal vocabulary repository based on information received from the user interaction module, and to analyze information accessible by device 100 (on device 100 or elsewhere, such as in the cloud). The digital assistant can act as an intelligent, self-learning tool that can create a personalized repository for the user. The digital assistant can be configured to continually or periodically perform analysis of audio information and update the personalized repository with additional and/or updated information. As set forth in more detail below, device 100 can be used to help a user/listener understand content of playback of recorded audible or speech information or audile speech converted from text by personalizing the content based on the user's command of, for example a language or dialect, using a tone of the user, using a playback speed corresponding to the user's speed of speech, or the like. By way of examples, device 100 can include or be a smartphone, an iPod, a tablet, a computer, or the like.

Figure 2:
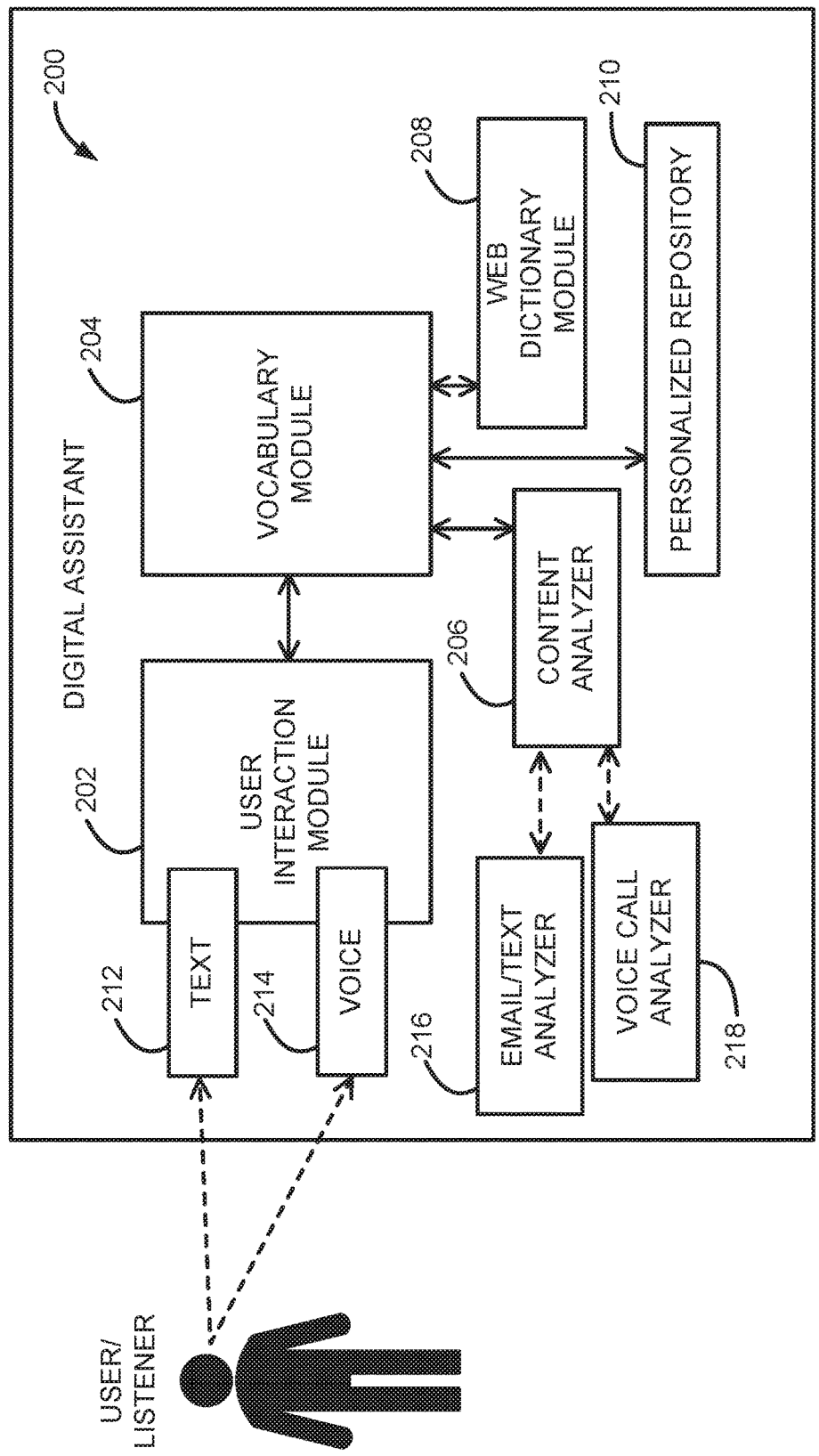
FIG. 2 illustrates an exemplary digital assistant in accordance with exemplary embodiments of the disclosure.

Turning now to FIG. 2, various components of an exemplary digital assistant 200 are illustrated. Digital assistant 200 includes a user interaction module 202, a vocabulary module 204, a content analyzer 206, and optionally a web dictionary module 208, and/or a personalized repository 210. As used herein, "module" can refer to computer program instructions, encoded on computer storage medium for execution by, or to control the operation of, data processing apparatus. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more the substrates and devices. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices). Device 100 can also include controls (e.g., a graphical and/or audible user interface) that allows a user to adjust a tone and/or speed of words during playback and store such information for use during the next playback.

User interaction module 202 provides a user interface to a user/listener and uses information from vocabulary module 204 to play content in a personalized manner to the user. In accordance with exemplary embodiments of the disclosure, user interface module 202 analyzes a user's voice (e.g., speed and/or tone) and word choice, and creates and stores statistics for both. For example, interaction module 202 can determine a rate (e.g., words per minute) that a user speaks and/or a preferred speech rate (words/minute) that the user prefers to listen to, a tone of a user's voice (or a preferred playback//play tone), and words commonly used by the user and cause such information, including rate and tone to be stored. User interaction module can further convert audio input into text to be stored. Once the audile information is converted to text, the text information is fed to vocabulary module 204. User interaction module 202 can include speech analytics to determine the complexity of words, the speed of speech of the user, and/or the tone of the user. User interaction module 202 can also receive input from vocabulary module 204 while audible information is provided to a user, such that the audible information is played in a personalized manner—e.g., at a desired rate of speed, using a desired tone, and/or using words familiar to the user (e.g., as determined using the statistics noted above).

As illustrated in FIG. 2, user interaction module 202 includes two sub modules: text submodule 212 and voice submodule 214. As described in more detail below, text submodule 212 and/or voice submodule 214 can be used to interact with a user to collect text information (via text submodule 212) and voice information (via voice submodule 214) and provide the text and voice information to user interaction module 202.

Vocabulary module 204 updates personalized repository 210 based on information, including statistics (e.g., words, a number of times words are used, a percentage of number of times a word is used, a number of times a word is looked up (e.g., using an electronic thesaurus and/or dictionary, how many times a word or reword are replayed, and the like) received from user interaction module 202. Vocabulary module 204 can also use web dictionary 208 to fetch words (e.g., more-commonly used synonyms and/or synonyms with fewer syllables) and/or images from web pages and send such content to a user via user interaction module during playback or playing of audio content. Additionally or alternatively, vocabulary module 204 can provide statistics, such as a number of times a word has been used, looked up, and the like, to user interaction module 202. Based on this information, user interaction module 202 can automatically play content at a personalized tone and/or speed, automatically use words during the playback/provision of audio information that are more commonly used (e.g., by the user or general public) and/or to automatically provide links to related information (e.g., as determined via use of keywords or the like).

Content analyzer module 206 assists the digital assistant to evolve over time based on user's data. In accordance with some examples of the disclosure, based on user consent, content analyzer module 206 will try to understand user's understanding of the language over time by analyzing emails, texts, chats, and listening to live calls. Each of these modes of analyzing can be independently authorized by a user—e.g., by requiring a password or the like. In the illustrated example, digital assistant 200 includes an email/text analyzer 216 to analyze written documents associated with a user and a voice call analyzer 218 to analyze voice calls (e.g., between the user and another party) and/or voicemail messages (e.g., left for the user). The information/data that is analyzed can be on one or more remote servers, such as an email server, or can be on a user's device, such as device 100. Once authorized by user, content analyzer can fetch real-time data about the user and provide information, including statistics regarding frequently-used words and the like (e.g., as noted above) to vocabulary module 204 for persistence. The analysis can be authorized each time a new analysis is performed, or a user can provide a single authorization for content analyzer to perform the analysis. Each time such analysis is done, vocabulary module 204 is updated. When the digital assistant is next used, the content is played using the current statistics.

Web dictionary module 208 is used to (e.g., automatically) reach out to web to enable a user to fetch definitions, synonyms, antonyms, web images, and/or links for the subject of interest.

Personalized repository 210 can be or include a database layer that persists the user's data and is referenced at runtime by other modules. Personalized repository 210 can reside on a user's device or in the cloud.

Figure 3:
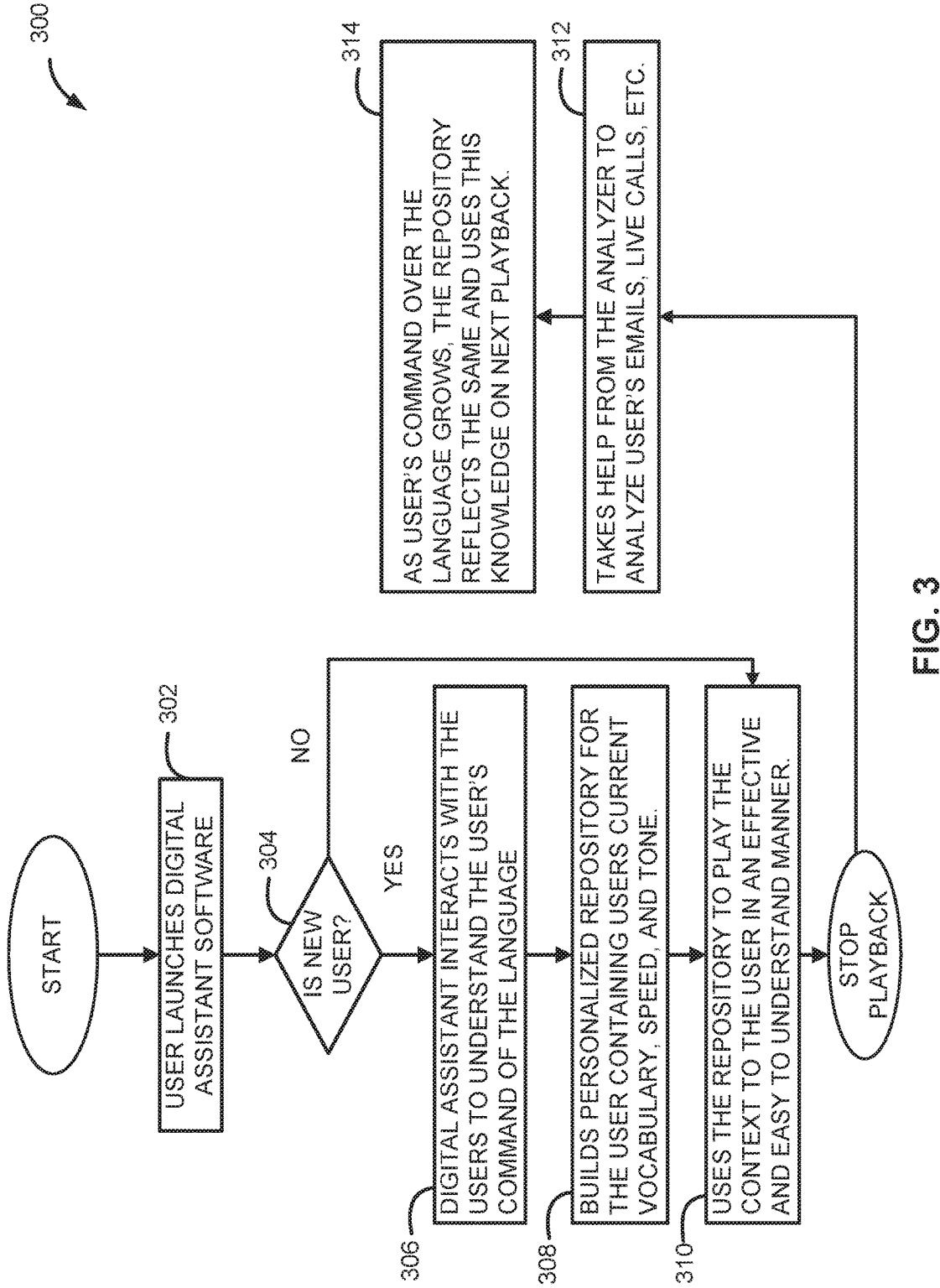
FIG. 3 illustrates a method in accordance with exemplary embodiments of the disclosure.

FIG. 3 illustrates a method 300 in accordance with additional examples of the disclosure. Method 300 includes the steps of launching a digital assistant (step 302), determining whether a user is new to interacting with the digital assistant (step 304), interacting with the user to understand a user's comprehension of a language (step 308), building a personal repository (step 310), using a content analyzer to analyze user information (step 312), and using information from a vocabulary module, playing information to a user.

Step 302 includes a user launching a client, agent or other application to launch a digital assistant, such as digital assistant 200. Once launched, a determination is made as to whether the user is a new user—or not. The determination can be made by submitting a question to the user—e.g., using a graphical and/or audible user interface.

In step 306, if the digital assistant receives a response from a user that the user is a new user, the then digital assistant interacts with the user to understand the user's command of a language. For example, before playing back a recorded media file or converting speech from text, the digital assistant can form a personalized repository. Once the user launches the digital assistant, a user can be prompted to select a language of interest. Then, the assistant will post questions to the user. In accordance with some examples, the user is expected to respond back in voice. Responding back in voice will allow the software to understand the speed and tone of voice that the user is most comfortable with. The questions posted by the assistant could be in text or voice, depending on a mode of operation of the running software. The questions can be as simple as: how do you do today; what is the current activity that you are working on; and the like.

In step 308, using the help of vocabulary module, the digital assistant forms statistics, such as those noted above for the user and updates the personalized repository. Once the primary interaction with the assistant ends and an early personalized repository is built, the user can play a recorded media or use the assistant for playing text to speech (step 310). For example, the audible information can be played to the user with a tone and speed that is familiar (e.g., the same or similar to (e.g., within +/− 10% or +/− 5% or +/− 2%) of the user's and using words that are synonyms that the user is familiar with, rather than more difficult words (e.g., words that are less commonly used by the user, less commonly used by the general public, and/or that have fewer syllables).

At step 312, the digital assistant uses a content analyzer to analyze email, text, calls, audio recordings and/or video recordings to provide information to the personalized repository.

In step 314, the personalized repository can be (e.g., automatically) continuously updated. In other words, the digital assistant can continuously learn a user's command over a language, which can evolve over time. The digital assistant can not only manage the playback speed automatically but can also change the content read out based on an evolving user's—e.g., vocabulary or command of a language and/or accent of speakers.

This method and device of the present disclosure can be used in a variety of applications, including in the field of education to help students gain a better understanding of a subject and/or language. The digital assistant can be used to play speech from text or media file. When there is also contextual information associated with the content being played to the user, then the digital assistant (e.g., digital assistant 200) can be enhanced to interact with the user for the subject of interest. This will not only analyze the user's language skills but also skills relevant to the subject, giving the user more information in that area, e.g. via web links, videos, etc.

A digital assistant and method described herein can additionally or alternatively be for the differently-abled people (e.g. users with a stammer or who cannot speak), and who have suitable hearing sense. In these cases, the digital assistant could be provided a pre-recoding with which a user is comfortable hearing. A tone and/or speed of playback can be monitored and recorded using a digital assistant. The user interaction module in this case can analyze the recording and playback conditions (rather than asking queries) and create the vocabulary module based on this information.

The present invention has been described above with reference to a number of exemplary embodiments and examples. It should be appreciated that the particular embodiments shown and described herein are illustrative of the invention and its best mode and are not intended to limit in any way the scope of the invention as set forth in the claims. The features of the various embodiments may be stand alone or combined in any combination. Further, unless otherwise noted, various illustrated steps of a method can be performed sequentially or at the same time, and not necessarily be performed in the order illustrated. It will be recognized that changes and modifications may be made to the exemplary embodiments without departing from the scope of the present invention. These and other changes or modifications are intended to be included within the scope of the present invention, as expressed in the following claims.

I claim:

1. A method of reviewing audio content, the method comprising the steps of:
   providing a device comprising digital assistant;
   forming a personal vocabulary repository using the digital assistant;
   using a vocabulary module of the digital assistant, determining one or more of a desired speed and a desired tone of playback of the audio content to a user; and
   using a user interaction module of the digital assistant, playing audio content to the user using the one or more of the desired speed and the desired tone of for the user;
   wherein the vocabulary module updates the personal vocabulary repository based on information received from the user interaction module.

2. The method of reviewing audio content of claim 1, wherein the user interaction module analyzes commonly-used words of the user and provides corresponding information to the vocabulary module.

3. The method of reviewing audio content of claim 1, wherein the user interaction module presents questions to a user and the device receives audible answers from the user.

4. The method of reviewing audio content of claim 1, wherein the vocabulary module accesses a dictionary module to access one or more of text, audio content, an image, and video content corresponding to the audio content and wherein the one or more of text, audio content, an image, and video content is provided to a user via a user interface of the device during playback of the audio content.

5. The method of reviewing audio content of claim 4, wherein the vocabulary module replaces one or more words with more-common words and wherein the user interaction module causes the more-common words to be played as part of the audio content.

6. The method of reviewing audio content of claim 4, wherein the user interaction module provides the images to a user interface during the step of playing audio content to the user.

7. The method of reviewing audio content of claim 1, further comprises a step of using a content analyzer module to review electronic communication on a user's device to provide information to the vocabulary module.

8. The method of reviewing audio content of claim 1, wherein the audio content comprises recorded audio information.

9. The method of reviewing audio content of claim 1, wherein the audio content comprises audio information converted from text.

10. The method of reviewing audio content of claim 9, wherein the audio information is converted from text using the digital assistant.

11. A device for reviewing audio content, the device comprising:
- a processor;
- a speaker coupled to the processor;
- a microphone coupled to the processor; and
- a computer usable medium comprising a computer readable program code recorded or storable in the computer useable medium, the computer readable program code comprising:
  - a user interaction module to analyze one or more of a tone and a speed of spoken content received from a user through the microphone and to use the speaker to play the audio content;
  - a vocabulary module to update a personal vocabulary repository based on information received from the user interaction module; and
  - a content analyzer to analyze information on the device accessible by the device.

12. The device for reviewing audio content of claim 11, wherein the computer usable medium further comprises a web dictionary to fetch one or more of text, audio content, an image, and video content corresponding to the audio content and wherein the one or more of text, audio content, an image, and video content is provided to a user via a user interface of the device during playback of the audio content.

13. The device for reviewing audio content of claim 11, wherein the user interaction module further analyzes words that are received by the microphone.

14. The device for reviewing audio content of claim 11, wherein the vocabulary module updates the personal vocabulary repository based on information received from the user interaction module.

15. The device for reviewing audio content of claim 11, wherein the user interaction module analyzes commonly-used words of the user and provides corresponding information to the vocabulary module.

16. The device for reviewing audio content of claim 11, wherein the user interaction module presents questions to a user using the speaker and receives audible answers from the user via the microphone.

17. A method of reviewing audio content, the method comprising the steps of:
- providing a device comprising digital assistant;
- forming a personal vocabulary repository using the digital assistant;
- using a vocabulary module of the digital assistant, determining one or more of a desired speed and a desired tone of for a user;
- using a user interaction module of the digital assistant, playing audio content to the user using the one or more of the desired speed and the desired tone of for the user;
- using a content analyzer module to review electronic communication on a user's device to provide information to the vocabulary module; and
- updating the personal vocabulary repository based on information received from the user interaction module.

18. The method of reviewing audio content of claim 17, wherein the vocabulary module accesses a dictionary module to access one or more of text, audio content, an image, and video content corresponding to the audio content and wherein the one or more of text, audio content, an image, and video content is provided to a user via a user interface of the device during playback of the audio content.

19. The method of reviewing audio content of claim 17, wherein the user interaction module presents questions to a user and the device receives audible answers from the user.

* * * * *